(12) United States Patent
Nedeltchev et al.

(10) Patent No.: US 9,258,295 B1
(45) Date of Patent: Feb. 9, 2016

(54) SECURE OVER-THE-AIR PROVISIONING FOR HANDHELD AND DESKTOP DEVICES AND SERVICES

(71) Applicant: Cisco Technology, Inc., San Jose, CA (US)

(72) Inventors: Plamen Nedeltchev, San Jose, CA (US); Helder F. Antunes, Morgan Hill, CA (US); David Sisto Iacobacci, Sunnyvale, CA (US); Pedro Leonardo, San Francisco, CA (US); Parag Thakore, Los Gatos, CA (US); Gautam M. Aggarwal, San Ramon, CA (US); Anuj Sawani, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 116 days.

(21) Appl. No.: 13/837,278

(22) Filed: Mar. 15, 2013

Related U.S. Application Data (60) Provisional application No. 61/695,808, filed on Aug. 31, 2012.

(51) Int. Cl.
*H04L 29/06* (2006.01)
*H04W 12/06* (2009.01)

(52) U.S. Cl.
CPC .......... *H04L 63/0823* (2013.01); *H04W 12/06* (2013.01)

(58) Field of Classification Search
CPC ..... H04L 63/0823; H04L 63/20; H04L 9/321; H04L 9/3263; G06F 21/33; G06F 21/57
USPC ......................................................... 713/156
See application file for complete search history.

(56) References Cited

U.S. PATENT DOCUMENTS 7,146,159 B1 * 12/2006 Zhu ........................... 455/414.1
7,165,173 B1 * 1/2007 Herle ........................... 713/151
(Continued)

OTHER PUBLICATIONS

"Broadband Radio Access Networks (BRAN), HiperMAN, Conformance Testing for the Network Layer of HiperMAN/WiMAX Terminal Devices, Part 2: Test Suite Structure and Test Purposes (TSS&TP)", ETSI TS 102 624-2 v1.2.1, Nov. 2009, 58 pages, Technical Specification, European Telecommunications Standards Institute, Sofia Antipolis Cedex, France.

(Continued)

*Primary Examiner* — Syed Zaidi
(74) *Attorney, Agent, or Firm* — Parker Ibrahim & Berg LLC; James M. Behmke; Stephen D. LeBarron (57) ABSTRACT

In one embodiment, a device and a services provisioning system establish an over-the-air connection with each other, and perform device posture validation to obtain a unique identification (ID) of the device at the provisioning system. The device and provisioning system then participate in device and user authentication in response to a confirmed unique ID by a backend access control system, where the device generates a secure key pair after successful user authentication. In response to the device being approved for services (e.g., checked by the provisioning system via a registration system), the provisioning system provides a root certificate to the device, and the device sends a certificate enrollment request back to the provisioning system. In response to a certificate authority signing the certificate request, the provisioning system returns a valid certificate to the device, and the valid certificate is installed on the device.

18 Claims, 7 Drawing Sheets

(56) References Cited

U.S. PATENT DOCUMENTS

| | | | |
|---|---|---|---|
| 7,333,799 B2* | 2/2008 | Natarajan | 455/411 |
| 7,506,368 B1 | 3/2009 | Kersey et al. | |
| 7,680,925 B2 | 3/2010 | Sathyanarayana et al. | |
| 7,748,035 B2 | 6/2010 | Nedeltchev et al. | |
| 8,180,051 B1 | 5/2012 | O'Toole, Jr. | |
| 8,341,250 B2 | 12/2012 | Pritikin et al. | |
| 2005/0101305 A1* | 5/2005 | Natarajan | 455/414.1 |
| 2005/0144437 A1* | 6/2005 | Ransom et al. | 713/151 |
| 2006/0089542 A1* | 4/2006 | Sands | A61B 5/4833 600/300 |
| 2006/0212937 A1* | 9/2006 | Natarajan | 726/15 |
| 2006/0259759 A1 | 11/2006 | Maino et al. | |
| 2008/0046735 A1 | 2/2008 | Nedeltchev et al. | |
| 2009/0222657 A1* | 9/2009 | Bender et al. | 713/156 |
| 2009/0222902 A1* | 9/2009 | Bender et al. | 726/10 |
| 2009/0304004 A1* | 12/2009 | Huynh Van et al. | 370/395.31 |
| 2009/0307142 A1* | 12/2009 | Mardikar | 705/72 |
| 2010/0306352 A1* | 12/2010 | Pritikin et al. | 709/221 |
| 2011/0136471 A1* | 6/2011 | Chen et al. | 455/411 |
| 2011/0264730 A1 | 10/2011 | Dattagupta et al. | |
| 2011/0265151 A1 | 10/2011 | Furlan et al. | |
| 2011/0265154 A1 | 10/2011 | Furlan et al. | |
| 2011/0282936 A1 | 11/2011 | Chekhanovskiy et al. | |
| 2013/0014217 A1 | 1/2013 | Yadav et al. | |
| 2013/0024921 A1* | 1/2013 | Gupta et al. | 726/6 |
| 2013/0036305 A1 | 2/2013 | Yadav et al. | |

OTHER PUBLICATIONS

"Terrestrial Trunked Radio (TETRA); User Requirement Specification TETRA Release 2.1, Part 11: Over the Air Management", ETSI TR 102 021-11 v1.1.1, Jul. 2007, 12 pages, Technical Report, European Telecommunications Standards Institute, Sofia Antipolis Cedex, France.

"MCTEL (U)SIM OTA Platform: Remote File Managment, Remote Application Management, BIP CAT-TP", (2010), Internet Site: http://www.mctel.net/download.php/en/pdf131/, downloaded Sep. 3, 2013, 2 pages, MCTEL, Monaco.

Rohini P. P., "Over-The-Air Provisioning of CDMA", Oct. 2004, 7 pages, Gemplus Technologies.

"Over-The-Air Programming", Internet Site: http://en.wikipedia.org/wiki/Over-the-air_programming, downloaded Sep. 3, 2013, 4 pages, Wikipedia Foundation, Inc.

Nedeltchev, et al., "Secure Over-The-Air Provisioning for Handheld and Desktop Devices and Services", U.S. Appl. No. 61/695,808, filed Aug. 31, 2012, 26 pages.

* cited by examiner

|   | EMPLOYEE SIDE | PHONE DEVICE MANAGER (DM) | OTHER EMAN TOOLS |
|---|---|---|---|
| 1 | EMPLOYEE BUYS A PHONE | | |
| 2 | EMPLOYEE FILLS OUT A REQUEST FORM | | |
| 3 | | | - IT GENERATES AN SMS LOCK PIM<br>- IT GENERATES A PKCS12 ENCRYPTED PASSWORD |
| 4 | | IT CREATES PROFILE FOR USER WITH SP PHONE NUMBER IN DM | |
| 5 | | | - IT SENDS A SEPARATE EMAIL TO THE EMPLOYEE WITH: PIN TO UNLOCK THE SMS AND THE PASSWORD FOR THE PKCS12 CERT |
| 6 | | DM SENDS USER AN SMS TO CREATE A DM PROFILE (WHICH FOR ALLOWS FURTHER SYNC WITH DM) | |
| 7 | EMPLOYEE RECEIVES SMS, AND PIN AND ALLOWS THE PHONE TO SYNC WITH DM (DM IS AVAILABLE OVER THE INTERNET) | | |

FIG. 5A

| | EMPLOYEE SIDE | PHONE DEVICE MANAGER (DM) | OTHER EMAN TOOLS |
|---|---|---|---|
| 8 | | DM WILL EXECUTE A SEQUENCE OF STEPS:<br>1. READ ASSET INFORMATION (IMEI, MAC ADD)<br>2. ENFORCE USER TO DEFINE A SCREEN PIN | |
| 9 | | | EMAN READS DM DATABASE EVERY HOUR FOR NEW PHONES AND CREATES PROFILES FOR USERS IN THE CALL MANAGER BASED ON NEW MAC ADDRESSES (OR THERE COULD BE AN API TO EXECUTE THIS TASK AS REQUESTS COME) |
| 10 | | DM WILL EXECUTE A SEQUENCE OF STEPS:<br>1. PUSH WIRELESS CONFIG (PEAP AND CERT)<br>2. PUSH SCCP CLIENT AND ITS CONFIG<br>3. PUSH A MACHINE MS/IOSCA CERT<br>4. (ENCRYPTED WITH A PASSWORD)<br>5. PUSH VPN CLIENT AND ITS CONFIG<br>6. PUSH EXCHANGE/EMAIL CONFIG | |
| 11 | | | - EMAN WILL NOTIFY THE IT ADMINS<br>- EMAN STARTS CHARGING USER FOR SERVICE<br>- EMAN NOTIFIES USER OF SUCCESSFUL DEPLOYMENT |

FIG. 5B

SECURE OVER-THE-AIR PROVISIONING FOR HANDHELD AND DESKTOP DEVICES AND SERVICES

RELATED APPLICATION

This application claims priority to U.S. Provisional Application No. 61/695,808, filed Aug. 31, 2012, entitled SECURE OVER-THE-AIR PROVISIONING FOR HANDHELD AND DESKTOP DEVICES AND SERVICES, by Nedeltchev, et al., the contents of which are incorporated herein by reference.

TECHNICAL FIELD

The present disclosure relates generally to computer networks and device provisioning.

BACKGROUND

There are a variety of provisioning systems for desktop and handheld systems in the industry which can be grouped in several typical models, such as various proprietary models (e.g., Apple®, Google®), Internet Service Provider (ISP) models, and Enterprise models. The existing Enterprise solutions for activating, provisioning, and deploying services on mobile phones or desktops involves a lot of manual work, it is prone to user errors, and does not provide Enterprise level of security and privacy. The existing solutions are based on shared keys, or personal identification numbers (PINs), or Short (or Simple) Messaging Service (SMS) messages, e-mails, or Active Directory (AD) user authentication, which inherently creates a security risk, associated with the lack of device authorization, posture, eavesdropping, keystroke hacks, and man-in-the-middle attacks, and creates an unacceptable user experience.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device and a services provisioning system establish an over-the-air connection with each other, and perform device posture validation to obtain a unique identification (ID) of the device at the provisioning system. The device and provisioning system then participate in device and user authentication in response to a confirmed unique ID by a backend access control system, where the device generates a secure key pair after successful user authentication. In response to the device being approved for services (e.g., checked by the provisioning system via a registration system), the provisioning system provides a root certificate to the device, and the device sends a certificate enrollment request back to the provisioning system. In response to a certificate authority signing the certificate request, the provisioning system returns a valid certificate to the device, and the valid certificate is installed on the device.

DESCRIPTION

As noted above, there are a variety of provisioning systems for desktop and handheld systems in the industry. In particular, though a variety of systems exist, there is no one system which offers all the components of secure trust—namely authorization, authentication, and posture. Also, "over-the-air" provisioning systems are not typical for Enterprise solutions for provisioning both desktops and handheld devices, and certificate based solutions are not common for handheld devices and desktops.

Illustratively, the techniques herein establish a secure connectivity to the provisioning system, based on the classic triad of trust—posture, authorization, and authentication, and over that secure connection push to the end device clients (AnyConnect Client, Mobile Device Management (MDM) client, etc.), images, services (enterprise voice application, e-mail, wifi, password management tools), and configuration changes, and/or enable the end device to reach internal resources over encrypted links (e.g., virtual private networks or "VPNs").

In particular, a unified Enterprise Model of secure device provisioning and deployment of handheld devices and desktops is described herein, e.g., to allow a device on the public Internet to enter a private VPN through interaction of authentication and identity elements that are key to the device joining the VPN in a zero touch manner. In other words, the techniques herein provide secure "over-the-air" provisioning. Note that the techniques herein provide components of posture and works generally only with valid posture, authorization, and authentication. Furthermore, the techniques herein illustratively use one universal approach to securely provision any of the common handheld and desktop provisioning systems currently available, and are agnostic to the type of the secure connection (e.g., as long as it is public-key infrastructure (PKI) based) and are suitable for any platform.

Figure 1:
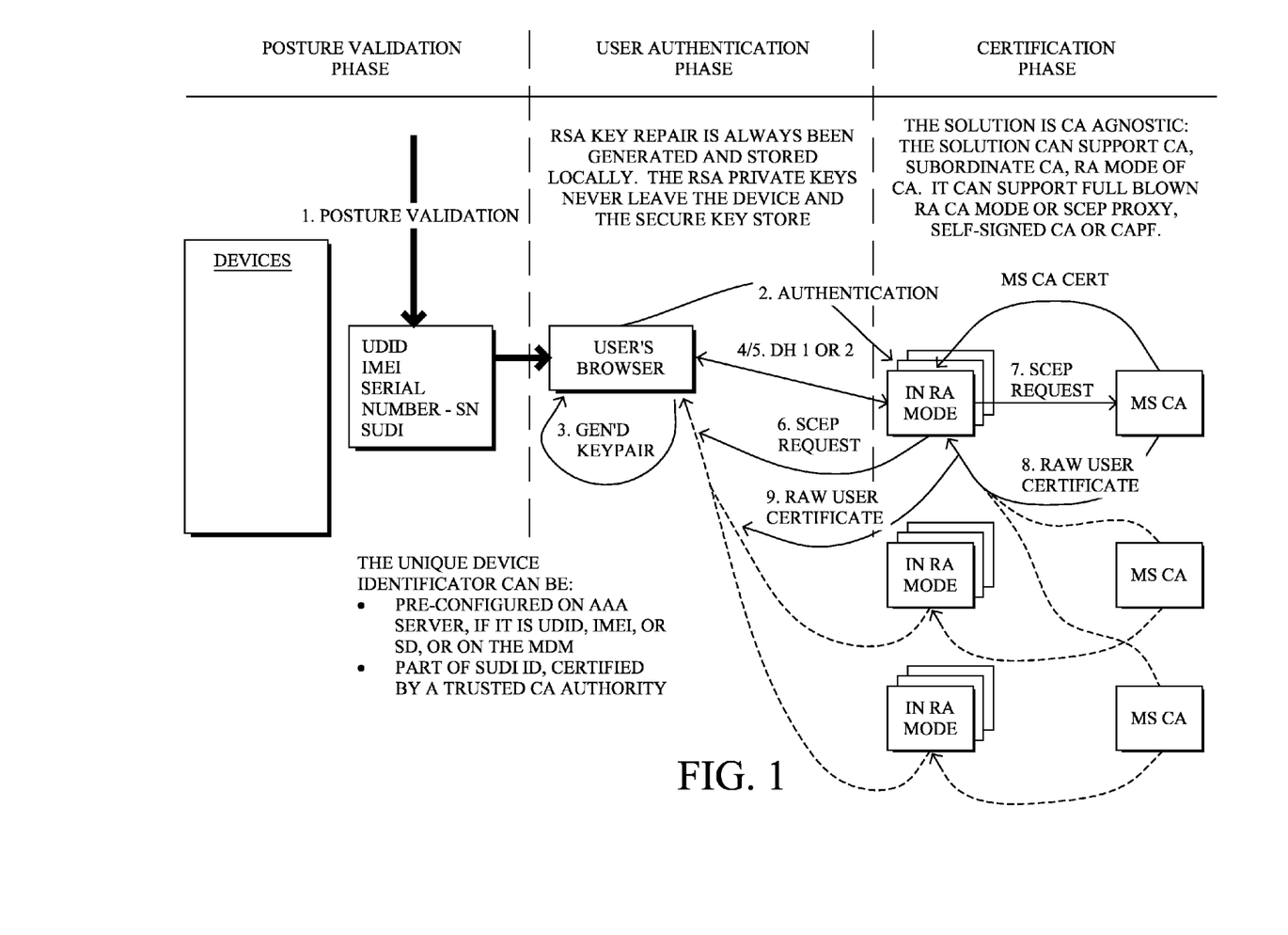
FIG. 1 illustrates an example over-the-air secure provisioning of mobile handheld devices.

As an example, reference is made to FIG. 1 illustrating over-the-air secure provisioning of mobile handheld devices. Generally, the following assumptions can be made: Assumption 1—The user has a valid and approved user service request. As a result either the device is configured with secure unique device identification (SUDI) (e.g., a manufacturer installed certificate), or a unique identification of the device is being configured on the Authentication, Authorization, and Accounting (AAA) server (e.g., PKI&AAA integration, where authorization is deleted on the AAA server upon disconnection) or on the MDM server of the Enterprise. Assumption 2—The user's device does not have a valid Enterprise certificate and it is petitioning "over the air".

With reference to FIG. 1, for the secure provisioning phase:

0. The user launches a browser and points to the Internet facing Domain Name Server (DNS) name—e.g., https://provision.mycompany1.com.

1. Device posture validation phase: A script will be pushed to the user's device to scan the device (posture validation can be included here):

If the device is handheld, the Unique Device Identifier (UDID) or International Mobile Station Equipment Identity (IMEI) information will be collected;

If this is a desktop device, the Serial number (SN) will be collected; and

If this is a SUDI configured device, SUDI will be collected.

The script compares the collected information with the backend system (e.g., an access control service (ACS), MDM, etc.) and based on that it can allow the next step when there is a match, or otherwise the process is terminated with a configurable message.

2. User authentication phase: The user will be presented with a login screen (e.g., within their browser) requesting a username and password which can be configured to authenticate. If the user fails the authentication, the process is terminated with a configurable message. Note that the type of the authentication is not relevant. It could be a one-time password (OTP) (e.g., Active Directory (AD), RSA (Rivest, Shamir, and Adelman) PIN, etc.).

3. Upon successful user authentication, an RSA key pair must be generated by the requestor (client). The keys must be generated as general and non-exportable. Note that the RSA private keys are illustratively generated always on the device, stored in a secure key store and never exchanged over any media.

4/5. Upon successful authentication, the provisioning system checks the backend registration system (MDM, AAA, etc.) for valid approval of the service and pushes the root certificate to the requestor. Note that the registration system may illustratively be in registration authority (RA) mode, such as for use with multiple headends.

6/7. Certificate Enrollment phase: The Simple Certificate Enrollment Protocol (SCEP) enrollment request includes the SN, or the UDID, or the IMEI. In the case of SUDI, the requestor just presents the certificate to the provisioning system. Then the requestor submits a SCEP enrollment request to the provisioning system. If the SCEP protocol is not available on the platform:

The provisioning system can fetch a signed certificate request from the end device.

Then, the provisioning system can run a SCEP enrollment to the certificate authority (CA) or third party CA on behalf of the requestor, acting as a proxy.

8. The Enterprise CA will sign the certificate request and it will send the locally significant certificate (LSC, or certificate with local significance) user certificate back to requestor. In the case of SUDI, the CA will validate the SUDI's certificate and it will re-certify the requestor with a valid CA certificate.

9. The valid certificate must automatically install on the requestor's computer in all supported and available key stores. User action is not required and should be avoided whenever possible.

I) One embodiment of the solution is described within this section regarding secure provisioning (e.g., secure socket layer (SSL) VPN provisioning). The diagram of this solution is available in FIGS. 2A-2B.

Figure 2A:
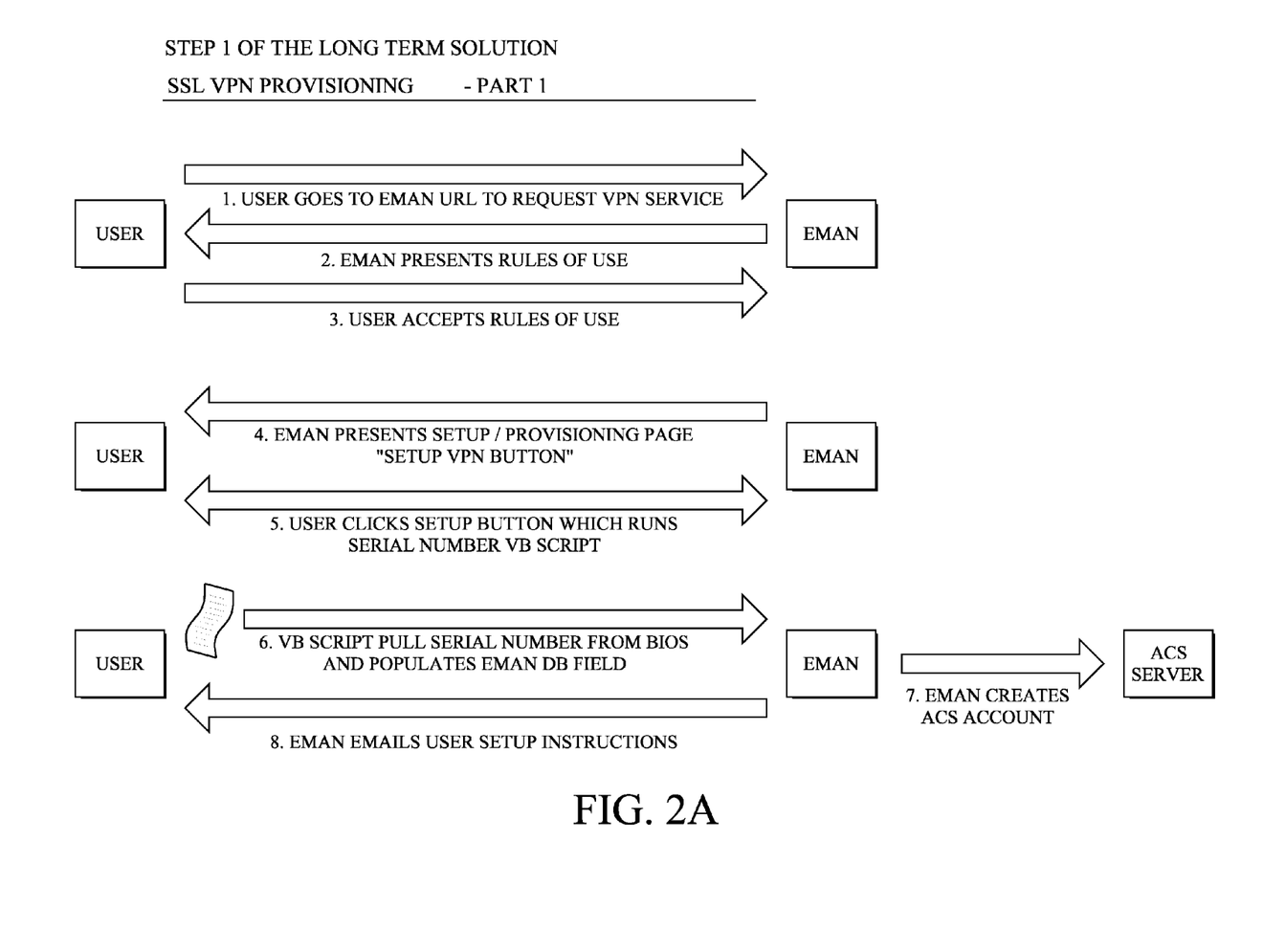
FIGS. 2A-2B illustrate another example of secure provisioning.
Figure 2B:
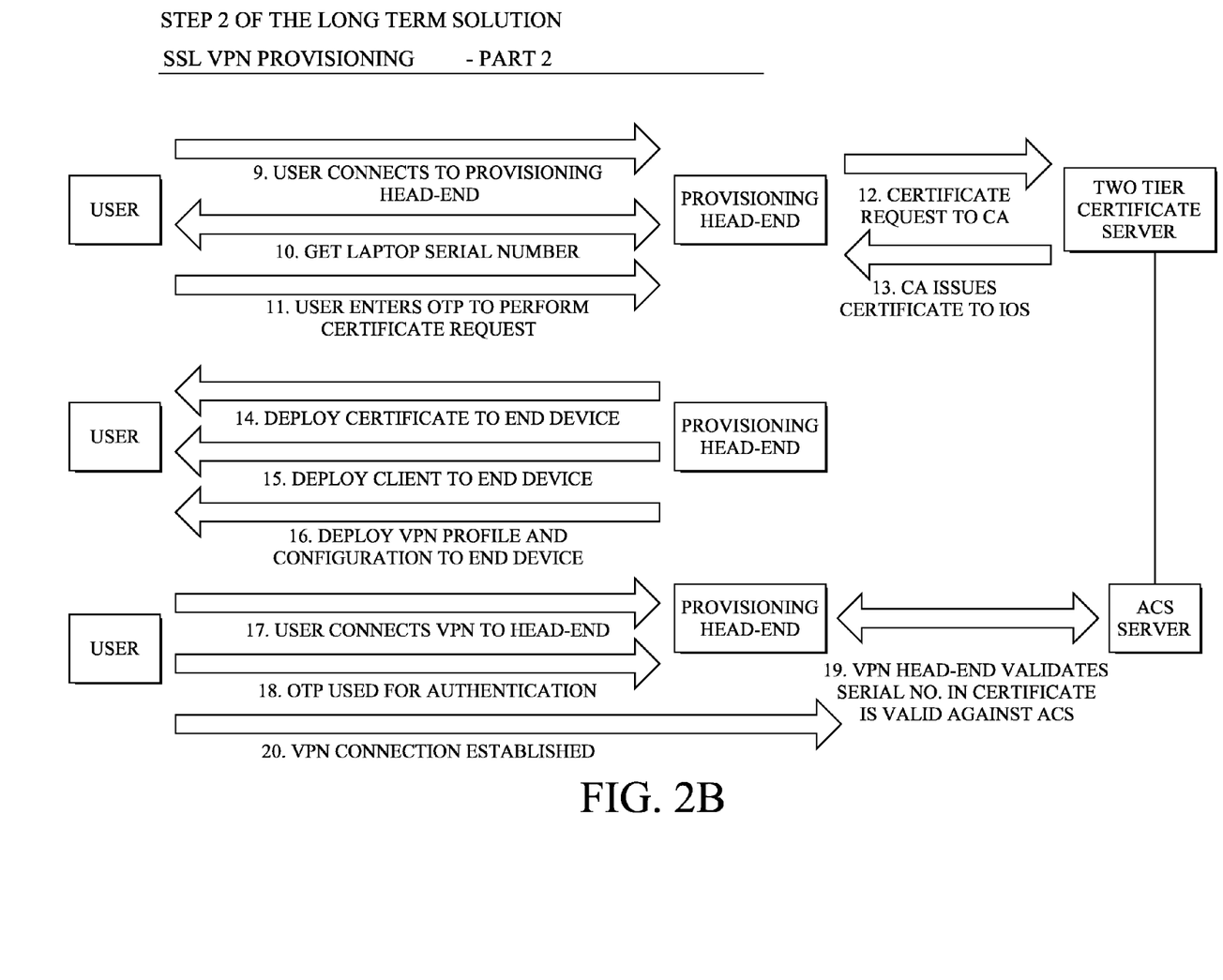

For instance, the illustrative (and non-limiting) steps 1-20 may be generally described as follows:

In step 1, a user accesses a website (e.g., an "EMAN" (Enterprise Management) URL) to request VPN service. In response, in step 2, the EMAN presents the rules of use to the user. The user must generally then accept the rules of use in step 3, and in step 4 the EMAN service may then present a setup/provisioning page, e.g., with a "setup VPN button".

In step 5, the user clicks the setup button, which runs a serial number (SN) script (e.g., a Visual Basic or "VB" script), and the script pulls the SN from BIOS in step 6, and populates the EMAN's database accordingly. In step 7, the EMAN may then create an AAA account on an AAA server, and in step 8 may then send (e.g., email) the user the appropriate setup instructions.

As such, the user may connect to a provisioning head-end in step 9, and the head-end then exchanges the serial number with the device in step 10. Note that in step 11, the user may enter an OTP to perform the appropriate certificate request, which is sent from the provisioning head-end in step 12 to a certificate authority (e.g., a two-tier certificate server), which returns the certificate in step 13.

In steps 14-16, the provisioning head-end deploys the certificate, a connection client, and a VPN profile and configuration to the end device, respectively. The user may then establish a VPN tunnel to the head-end in step 17, illustratively using an OTP for authentication in step 18, and the head-end and AAA server validate the serial number in the certificate in step 19, to allow the VPN connection to be established in step 20.

After the provisioning, the user may launch the browser and establish a secure connection to the headend. In addition, for device posture validation, the device may be scanned for anti-virus, or checked against MDM for a valid MDM account, or it could be checked against backend AAA server. For instance, the SN from BIOS may be checked against the local certificate value and against the AAA server to make sure this is the device authorized to establish a secure VPN tunnel. If everything checks accordingly, the device is authorized. If not, the process is terminated with a configurable message. (Note that if the user does not have a valid connection client installed, it may be pushed to the user and installed.)

Further, regarding user authentication, if additional authentication is configured, the user may be presented with a login screen requesting username and password which can be configured to authenticate against a server (e.g., a remote authentication dial-in user service or "RADIUS" server). If the user fails the authentication, the process is terminated with configurable message. If the user passes the authentication, the session is established and any configuration could be sent to the user's device.

Figure 3:
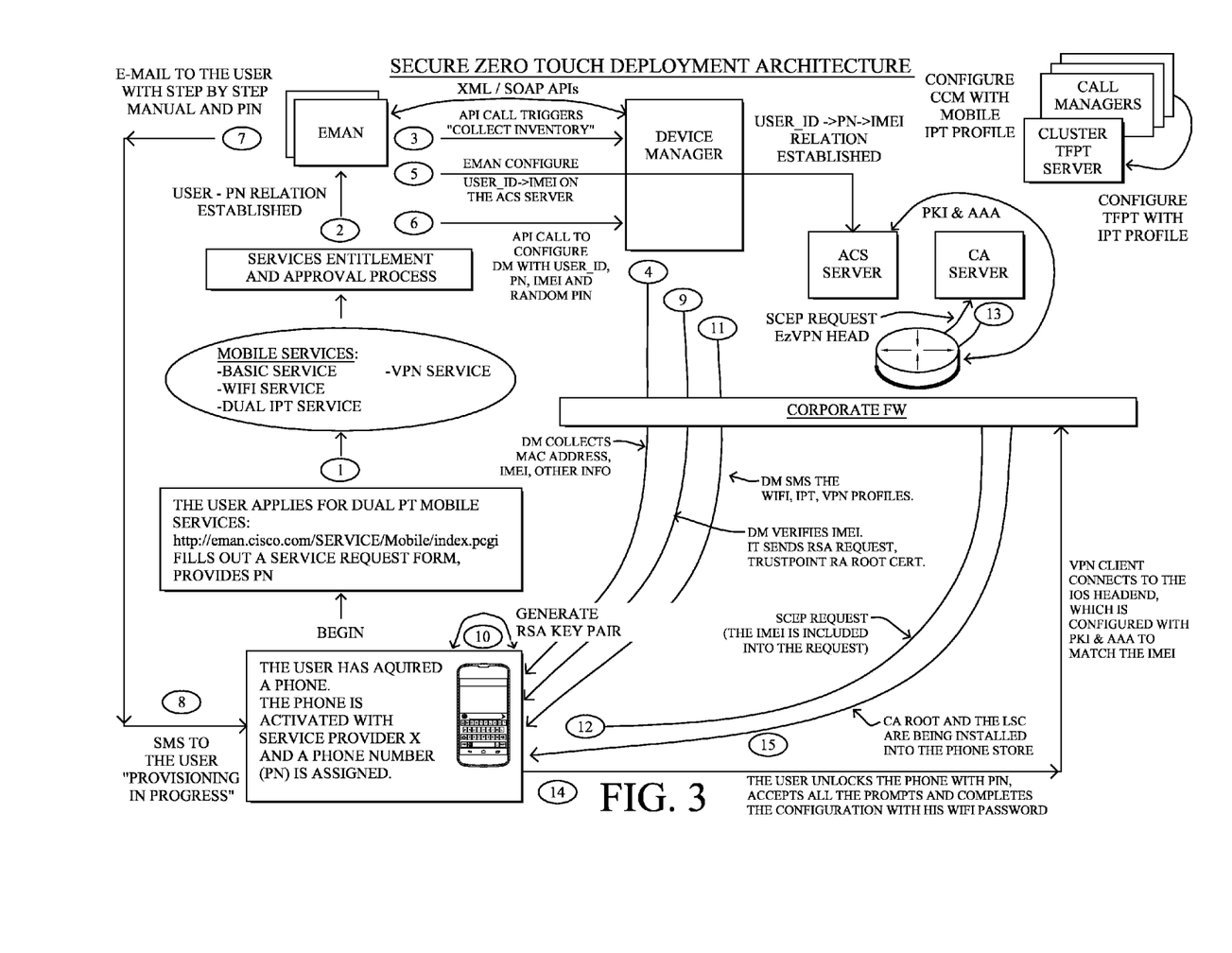
FIG. 3 illustrates an example secure zero touch deployment architecture.

II) Another embodiment of the solution is the diagram shown in FIG. 3 for a "Mobility Service Architecture". Here the provisioning system is being used as part of an overall architecture to deliver security, wifi, dual phone mobile service, e-mail and several other services to the user's device.

In particular, as shown in FIG. 3, starting in the lower left corner (at "BEGIN"), a user acquires a phone, which is activated with a service provider and assigned a phone number (PN). In step 1, the user applies for mobile services with their company, such as by visiting an internal company website (e.g., http://eman.cisco.com/SERVICE/Mobile/index.pcgi), and fills out a service request form (providing the phone number). Example services may comprise basic service, WIFI service, Dual IPT service, VPN service, etc. The user-to-PN relation is established at the EMAN server(s) during a services entitlement and approval process in step 2. The EMAN server then executes an application programming interface (API) call to trigger collection of inventory from a device manager (DM) in step 3 (e.g., exchanging eXtensible Markup Language (XML)/Simple Object Access Protocol (SOAP) messages), such that the DM in step 4 collects the MAC address, IMEI, and other info from the mobile device, accordingly.

Additionally, in step 5 the EMAN server configures the user_ID→IMEI on the AAA server, to establish the user_ID→PN→IMEI relation. Also, in step 6, the EMAN server generates another API call to configure the DM with the user_ID, PN, IMEI, and a random PIN. This PIN and optionally a step-by-step instruction manual may sent (e.g., emailed) to the user in step 7. An SMS may also be sent to the user in step 8 indicating that the provisioning is in process.

At step 9, the DM verifies the IMEI, and sends a notification so the mobile device can generate an RSA key pair. The mobile device may then generate an RSA key pair in step 10, and in step 11 the DM may send an SMS that includes the WIFI, IPT, and/or VPN profiles. For instance, the mobile IPT profile may be configured on the call control managers (CCMs), which may configure a TFTP server with the IPT profile, accordingly.

In step 12 the client mobile device sends an SCEP request to the provisioning headed, while traversing a firewall (FW, e.g., corporate FW), where the provisioning headend acts as a Registration Authority (RA), authorizes the SCEP request, and then forwards the SCEP request to a certificate authority (CA) server. In step 13, the CA root and a locally significant certificate (LSC) are installed into the mobile device's store, such that in step 14, and the user unlocks the phone with the PIN, accepts any/all of the prompts, and completes the configuration with his/her WIFI password, where the VPN client connects to the headend, which is configured with PKI&AAA to match the IMEI.

III) In addition, configuring the unique ID as part of the SCEP request of the petitioner and the possible match and check on an AAA server creates much more effective and instantaneous disconnect of the end device, which is applicable for lost/stolen type of "bring your own device" (BYOD) scenarios. For instance, a PKI/AAA integration allows for instantaneously disconnecting a device by deleting AAA authentication when disconnecting the VPN (IPSec) tunnel, such that the device would be unable to re-establish a connection when the AAA server is checked in a subsequent login attempt.

The techniques described herein, therefore, provide for secure over-the-air provisioning for handheld and desktop devices and services (e.g., of customers). In particular, the techniques herein provide a universal approach for PKI-based secure provisioning and implementation to all Enterprise desktops, handheld devices, and BYOD. The illustrative implementation provides:

- "Over the air" secure provisioning which is a key for cloud based mobility solutions.
- Provisioning solution for any platform, including most of the popular desktop and handheld and BYOD.
- PKI-based zero touch deployment methods.
- Consistent user experience for all platforms, full automation of the process, with zero cost to the enterprise, enabling any service deployment over the secure connection.
- Highest level of security based on the classical steps of the triad of technical trust—posture, authorization and authentication.

Example Embodiment

In an example embodiment as described below (and with reference generally to FIGS. 4-5B), a universal secure enterprise based provisioning solution is described that enables provisioning from any location, including over the air. The techniques herein provide an end-to-end platform for secure deployment of mobile devices and services starting from the request process initiated by end user all the way to secure remote deployment of these mobile devices without user intervention. It also takes care of billing process, automated registration with call manager, adding users to AAA servers and enables the dual mode phones to establish tunnels with VPN headends with certificates etc.

That is, the proposed solution designed and designated to provide end to end secure provisioning, which can be applied for any device, any service as long as the device supports or it is Open Mobile Alliance Device Management (OMA-DM) compliant, such as many smart phones currently available. Some mobile phones are not OMA, and can still be supported if there is DM client pre-installed on these phones. The solution is based on zero touch deployment concepts and it allows the user to subscribe/unsubscribe, deploy and manage the services on the device, and requires no or very minimal user interaction during the secure provisioning. It is fully automated; it is designed for large scale deployments (tens of thousands of users), and provides low total cost of ownership (TCO).

Figure 4:
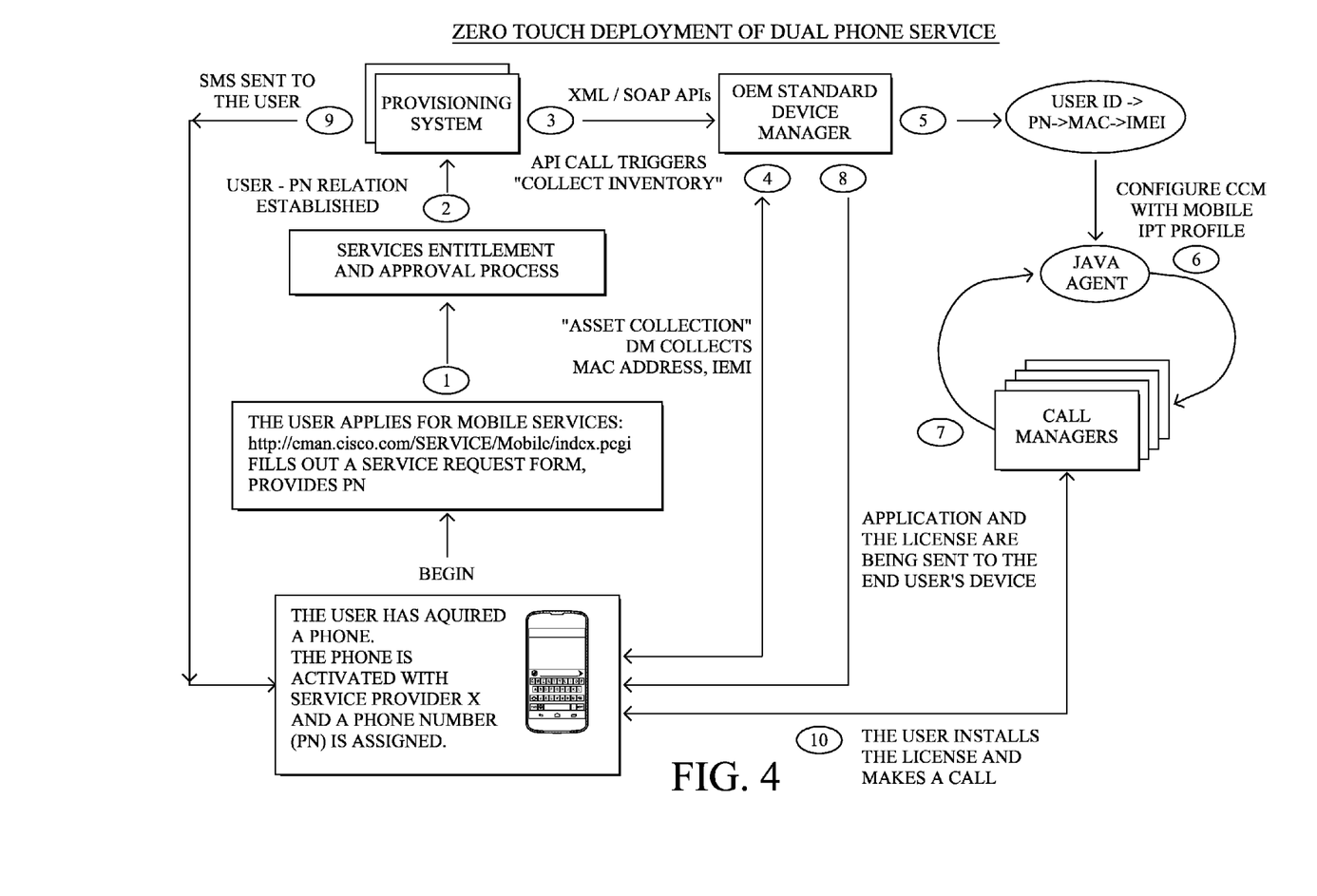
FIG. 4 illustrates an example zero touch deployment of a dual phone service.
Figure 5A:
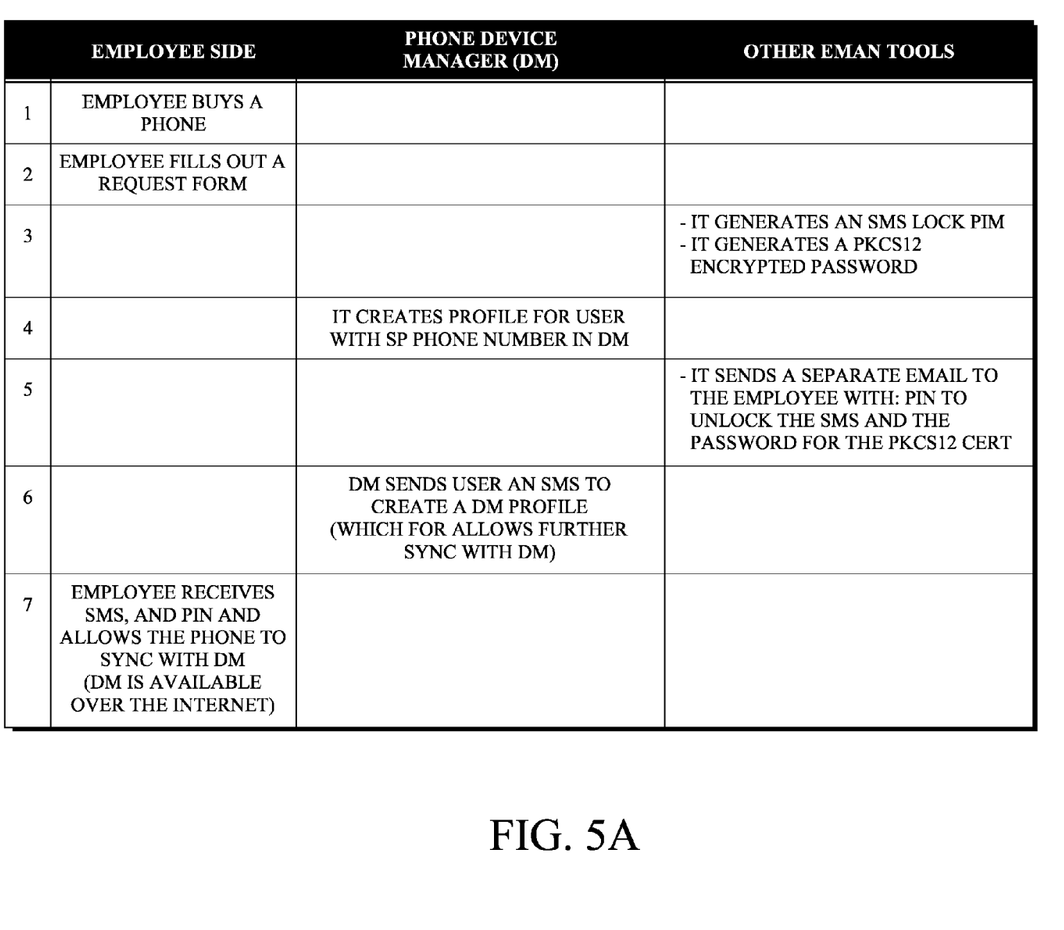
FIGS. 5A-5B illustrate an example flow diagram of an example embodiment herein.

With reference to FIG. 4, similar to (and generally simplified from) FIG. 3, the process starts at "BEGIN" where a user acquires a phone, which is activated with a service provider and assigned a phone number (PN). Also, in step 1, the user applies for mobile services with their company, such as by visiting an internal company website, and fills out a service request form (providing the phone number). Again, the user-to-PN relation is established at a provisioning system during a services entitlement and approval process in step 2, and the provisioning system executes an API call to trigger collection of inventory from a device manager (DM) in step 3, such that the DM in step 4 collects the assets as requests from the mobile device, accordingly. Additionally, in step 5 the DM establishes the user_ID→PN→IMEI relation, such as through a Java agent, which in steps 6/7 configures the mobile IPT profile on the CCM(s).

In step 8, the dual phone application and associated license are sent to the end user's device, and in step 9 a message (e.g., SMS) is sent to the user, which includes the PIN as noted above. In step 10, the user may then install the license and make a call, accordingly.

Figure 5B:
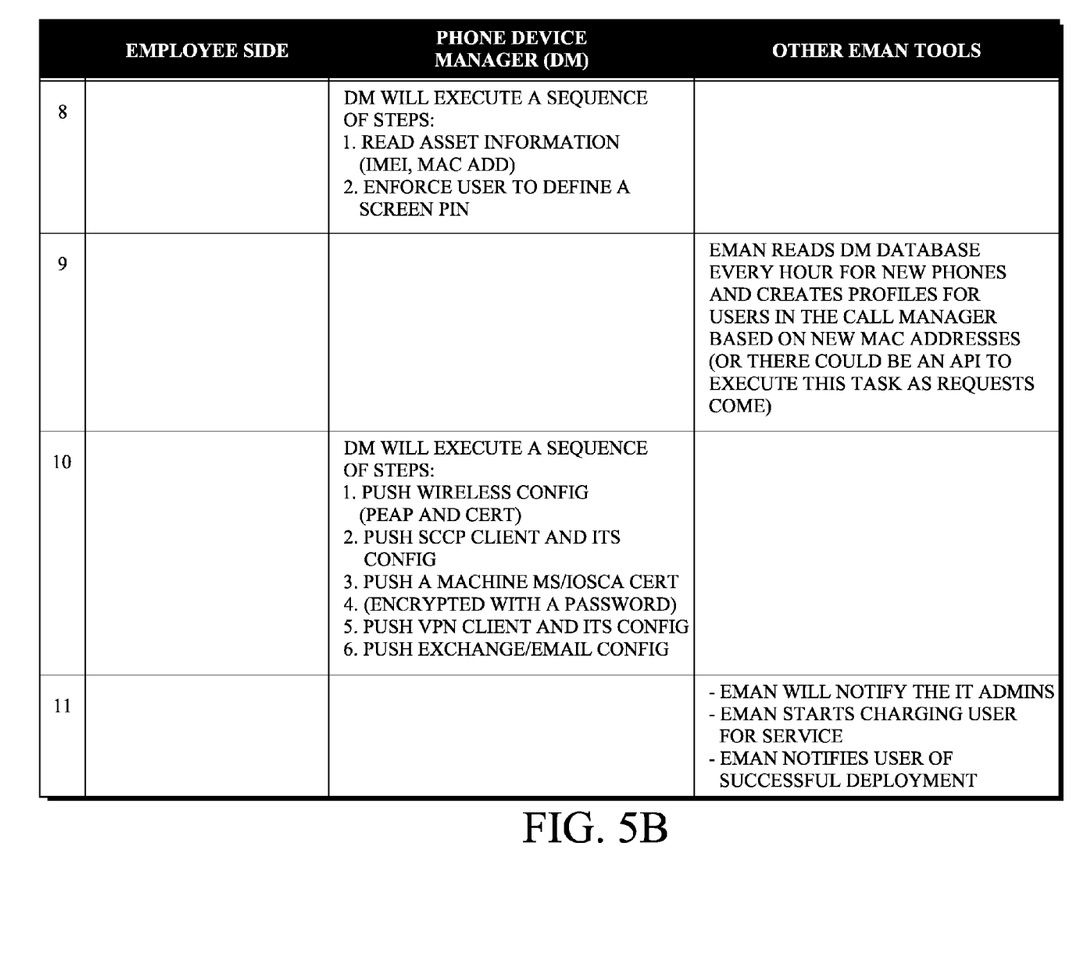

Now with reference to FIGS. 5A-5B, still another example embodiment is described in terms of a flow diagram, shown in three columns representing the employee side (user/client), the phone device manager (DM), and other EMAN tools, from left to right respectively. Note that the example in FIGS. 5A-5B use Public-Key Cryptography Standards #12 (PKCS12), rather than PKCS #10 (PKCS10) as described above and as will be understood by those skilled in the art. That is, PKCS12 is a standard to package private keys and certificates in one file with encryption/password-protection. On the other hand, PKCS10 (a preferred embodiment) is a certificate enrollment standard that includes a certificate signing request, where the private key is not generated on the device itself.

In step 1 of FIG. 5A, an employee buys a phone, and fills out a request form in step 2. In step 3, IT generates an SMS lock PIN as well as a PKCS12 encrypted with a password. In step 4, IT creates a profile for the user with the service provider (SP) phone number in the DM, and in step 5, IT sends a separate email to the employee with the PIN to unlock the SMS and the password for the PKCS12 certificate. Then in step 6, the DM sends the user an SMS to create a DM profile (which allows for further synchronization with the DM).

In step 7, the employee receives the SMS and the PIN, and allows the phone to synchronize with the DM (e.g., over the Internet). Accordingly, in step 8, the DM executes the following sequence:

8-1. Read asset information (e.g., IMEI, MAC address); and 8-2. Enforce user to define a screen PIN.

Next, in step 9, the EMAN reads the DM database (e.g., every hour or using an API in response to requests coming in) for new phones and creates profiles for users in the Call Manager based on new MAC addresses. In step 10, the DM executes the following sequence:

10-1. Push the wireless configuration of the phone (Protected Extensible Authentication Protocol (PEAP) and certificate);
10-2. Push the Skinny Call Control Protocol (SCCP) client and its configuration;
10-3. Push a machine certificate (e.g., MICROSOFT or APPLE IOS certificate authority certificate);
10-4. Optionally encrypt the machine certificate with a password;
10-5. Push the VPN client and its configuration; and
10-6. Push the Exchange/Email configuration.

Lastly, in step 11, the EMAN notifies the IT administration, and starts charging the user (or the user's plan) for service and notifies the user of successful deployment.

The techniques herein thus provide components of device posture, based on phone number and International Mobile Equipment Identity (IMEI). They provide a secure way to certify the device, based on RSA key generation on the phone, followed by a SCEP request to a RA and CA Certificate Server. In the techniques herein, the private keys are generated and stored on the phone. The digital certificates are being used to establish a VPN connection with the Enterprise IOS headend. The user authentication is based on a randomly generated and managed PIN and can be combined with user authentication if needed.

In particular, described in another manner, steps 1-21 below illustrate another example embodiment that may benefit from the techniques described herein:

1) An admin configures the DM so that a phone can dynamically download applications like Session Initiation Protocol (SIP)/SCCP clients, VPN clients or device and root certificates etc. without user intervention. Moreover, the admin configures appropriate Wi-Fi, IP telephony settings, and VPN Policies, RA root certificates, and device certificates depending on organizations policies. These settings can be pushed after the user has appropriately enrolled for different services. The user is generally always subscribed for inventory collection services by default, which gives an ability to the DM to dynamically collect MAC Address and IMEI information etc. He is also subscribed to other services requested in this step.

2) Employee Buys a phone. He fills out a request form and sends a request for services to a Mobile Voice Provisioning System. He fills in his cell phone number in the form.

3) The Mobile Voice Provisioning System sends an approval request to the manager. The service request is approved and a billing process is initiated.

4) The provisioning system makes an API call to configure the DM with the username and cell phone number.

5) The EMAN or the DM generates a random PIN which is used to open an initial SMS.

6) IT sends a separate email to the user with this random PIN to open the initial SMS and a password for a pkcs12 certificate (note this pkcs12 password is used later.)

7) The user receives an SMS and uses the PIN sent in step 6 to open this SMS. The correct pin will enable the user to save the DM configuration profile. This SMS is just sent once to save the DM profile and all future communications between the phone and the device manager would be via https.

8) The DM will execute following sequence of steps and hence collect inventory using https, based on self signed certificate of the DM:
  1. Read asset information (IMEI, MAC add);
  2. Enforce user to define a screen PIN.

9) The DM server notifies the Mobile provisioning tool whenever new asset information for a user is obtained or Mobile provisioning tool reads DM database every hour.

10) The Mobile provisioning tool uses the MAC address of the IP telephony (IPT) to configure the call control manager (CCM). It clones the existing user account and creates Mobile Profile. A Trivial File Transfer Protocol (TFTP) profile may also be configured.

11) The Mobile provisioning tool configures the user_ID→IMEI on the ACS server. (A user-phone number, IMEI relation is created).

12) The DM sends the WIFI, IPT and VPN profiles to the cell phone over HTTPS. The WIFI user name of the user is being supplied as part of the WIFI bundle. The user feeds the wifi password which in this case could be the user's Active Directory password (ADP).

13) The DM sends to the user a request to generate an RSA key pair, the trust point and the renewal interval of the REG server and the root certificate of RA.

14) The phone generates an RSA key pair.

15) The DM forces the cell phone to run a SCEP request (PKSC10) to REG (RA) server and includes into the SCEP request the IMEI of the phone.

16) The VPN client on the phone initiates SCEP request.

17) The VPN server decrypts the SCEP request and sends it to a CA Server.

18) The CA signs the certificate and sends it back to the VPN server.

19) The certificate is being sent to the VPN Client. The user imports the signed certificate. The user disconnects the recent session and launches another session to establish a Certificate based VPN session. Note: IT administration can also generate a PKSC-12 (CA Root Certificate and Locally Significant Certificates or the device certificate are sent to the phone) for a user and saves it on DM. Since the user is subscribed to the VPN he can get this pkcs12 file. Moreover, the password for the pkcs12 file is sent in initial email in step 6. However this process is less secure and less scalable. Advantage of generating RSA key pairs locally on the device in step 14 is that private keys are never exchanged over insecure medium and also these private keys are non-exportable hence user cant use these certificates on multiple devices.

20) The user launches the VPN. The VPN client connects to the headend, which uses certificates with or without x-auth to complete the tunnel connection. Thus the solution also provides a secure method of remote provisioning and obtaining digital certificate without compromising security.

21) After successful tunnel establishment, the phone registers with the CCM configured in step 10 to gain access to corporate resources (e.g., voice over IP, "VoIP").

Notably, the solution simplifies large scale deployment of mobile devices using a Zero Touch Deployment Model, e.g., using a VPN head-end gateway. Users can get SCCP applications, SCCP settings, Wireless settings, VPN client, VPN settings and Policies, Certificates etc. using https. The techniques also allow the dual mode phones to establish VPN connectivity to Routers using certificates and without x-auth. Disabling x-auth provides a good user experience, and simplifies the process of remote certificate enrollment. Mobile voice provisioning system take care of application request, billing, automated read of device management and adding users to call managers and AAA servers etc. It is important to note that the techniques herein are based on an end to end deployment of dual mode phones which would include all key aspects of mobile voice provisioning system, using certificate based authentication between routers at VPN headends and dual mode phones, AAA servers, device management, call managers, etc.

The solution uses the DM to manage the phones and pass the settings and certificates etc. The user still doesn't have access to the corporate resources. Once the phone gets these certificates, settings etc., the user tries to establish VPN connectivity with the router and the router authenticates the phone based on a valid device certificate. Moreover ACS can be used to track the IMEI versus the phone number. In this manner, the user cannot export certificates to another phone by changing the phone.

Illustratively, the device gets on the secure enterprise network first before it can contact the DM server since the DM can be configured with DM proxy, or configured to allow certain traffic from behind the firewall (FW), or if the Enterprise security policies allow that, it can be hosted in the DM zone (DMZ). From a user perspective, unless the user has been approved of services by his manager he would never have a profile on the DM server and hence will never get all the services provisioned on the phone. This solution will mainly support any OMA-DM compliant phones. As noted, most of the smart phones available today are OMA-DM compliant, and other mobile phones can still be supported if there is an additional client installed on these phones.

Notably, at step 5 immediately above, the PIN which is used to open an initial SMS (implying that the SMS is encrypted) is used to save the DM client information on the phone. Also at step 5, regarding whether the pkcs12 password is in the SMS or the email, and whether the user enters this password, there are two ways to use the pkcs12 password: a) User enters it—in this case user gets this password via email; b) the password would be entered on the DM and hence the user is never asked for the password of pkcs12. Moreover, one embodiment avoids using pkcs12 (e.g., using pkcs10). In that case a password is not even needed.

Also, at step 12, the DM sends the profiles to the phone via https where the DM initiates this connection. DM generally sends only DM profile via SMS. Others are settings and not profiles. The DM initiates these https connection to the phone once the user account is activated on the DM. If the user is offline for some reason the DM can be programmed to resend the publication again after defined interval.

Note also that at step 13, the DM sends a request to the phone to generate an RSA key pair (the user is not involved).

Further, at step 17, the SCEP request would normally be sent to the RA or CA. The SCEP request can be sent to the DM, if the DM maintains the functionality of RA Server, or it can be sent to the headend, which can natively support RA or REG mode. In the second case, the device may be listening to a configured TCP port (e.g., TCP 8000). In both cases, the PKI & AAA may be used to authorize the petitioner and make sure that the certificate will be sent to the user with a valid IMEI account on the ACS server.

Moreover, at step 19, since SCEP is specified the certificate issued would be retrieved by the SCEP client and stored appropriately. In that context the certificates would be stored in appropriate Device Store and Authority store on the phone. The user doesn't have to import the signed certificate. Additionally, when using a PKCS12 to distribute a full certificate and keypair, the DM distributes the PKCS12 file to the phone using https if the user is subscribed to vpn services. The user had applied for services with Mobile voice provisioning system. This voice provisioning system can interact with both DM and call manager, e.g., adding a user device in call manager for voice services and creating a profile in DM for users phone number and subscribes him here for all services he was approved by his manager.

Regarding user interaction:

In step 7, the use of a PIN is needed since the SMS is encrypted.

In step 12, the use of Extensible Authentication Protocol (EAP)—Transport Layer Security (TLS) will avoid the need for a wifi password (current assumption was EAP-PEAP).

In step 19, "user imports the signed certificate" and "the user disconnects the recent session and launches another" will be required by any device if using pkcs10. In case of pkcs12, this will not be required.

Note that the provisioning system is based on the user's request, approval, and initiation of the provisioning process. As a result, a unique script runs on the headend, collects the SN (UDID, IMEI) of the end device which becomes a unique identifier of the end device for authorization. The SN then is being included into the SCEP request as part of the PKCS#7 requests. That request is being matched against a database on the backend to make sure that this device is authorized to establish a SA with the headend, which is unique for handheld devices and desktops, as described above. Also, the techniques describe an EzVPN (IPSec), PKI certificate based provisioning system with set of APIs to connect the system to backend enterprise request, approval, and billing process. Moreover, the techniques include several store procedures to enable SN to be fetched from the OS, the signed PKCS#7 to be fetched and sent to IOS CA and so forth.

Note further that the user may receive an SMS to unlock his certificate and install it on his device. The user types the password, unlocks the PKCS#12, installs the certificate on the device store where most of the known solutions require the user store to store the certificate which makes the connection user specific. Instead, the techniques herein allow any corporate user to use the phone and the screen password that is being used in combination with PKI for twofold authentication in addition to the device authorization in the beginning of the provisioning process. The platform can deliver any service over the encrypted tunnel both from the corporate premises and over the air.

Accordingly, the techniques herein provide a unified Enterprise Model of secure device provisioning and deployment of handheld devices and desktops is described, e.g., to allow a device on the public Internet to enter a private VPN through interaction of authentication and identity elements that are key to the device joining the VPN in a zero touch manner. In particular, the techniques herein provide secure "over-the-air" provisioning. Illustratively, the techniques described herein may be performed by hardware, software, and/or firmware, such as in accordance with various processes, which may contain computer executable instructions executed by a processor to perform functions relating to the techniques described herein.

While there have been shown and described illustrative embodiments herein, it is to be understood that various other adaptations and modifications may be made within the spirit and scope of the embodiments herein. For example, the embodiments have been shown and described herein with relation to particular protocols that will be understood by those skilled in the art. However, the embodiments in their broader sense are not as limited, and may, in fact, be used with other similar protocols not specifically mentioned. In addition, various optional steps have been shown that may merely be illustrative in an example implementation, and are not meant to be limiting to the scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    accessing a website by a device to request use of over-the-air VPN services;
    in response to the device accessing the website, establishing, by the device, an over-the-air connection to a services provisioning system of a virtual private network (VPN), the services provisioning system configured to provision both mobile and desktop devices;
    performing device posture validation by pushing a script to the device which scans the device to provide a unique identification (ID) of the device to the provisioning system, wherein the unique ID is confirmed by a backend access control system;
    participating in device user authentication upon confirmation of the unique ID;
    in response to authentication, generating a security key pair at the device;
    receiving over-the-air a root certificate at the device in response to the device being approved for services;
    sending over-the-air a certificate enrollment request from the device to the provisioning system;
    receiving over-the-air a valid certificate at the device in response to a certificate authority signing the certificate request; and
    installing the valid certificate on the device to be used in connecting the device over-the-air to the VPN.

2. The method as in claim 1, wherein the unique ID is one of either a Unique Device ID (UDID) or an International Mobile Station Equipment Identity (IMEI) of the device as a handheld device.

3. The method as in claim 1, wherein the unique ID is a serial number of the device as a desktop device.

4. The method as in claim 1, wherein the unique ID is a secure unique device identification (SUDI) of the device.

5. The method as in claim 1, wherein the device user authentication comprises a user name login and authenticating password.

6. The method as in claim 5, wherein the authenticating password is a one-time password (OTP).

7. The method as in claim 1, wherein the certificate authority signing the certificate request in response to a secure unique device identification (SUDI) as the unique ID comprises validating a SUDI certificate and recertifying the device with a valid certificate authority certificate.

8. The method as in claim 1, wherein the device is associated with a valid service request.

9. A system, comprising:
    a device; and
    a services provisioning system of a virtual private network (VPN) that provisions both mobile and desktop devices;
    wherein the device and provisioning system are configured to:
    in response to the device accessing a website used to request VPN connection services, establish an over-the-air VPN connection with each other;
    perform over-the-air device posture validation by pushing a script to the device which scans the device to obtain a unique identification (ID) of the device at the provisioning system, wherein the unique ID is confirmed by a backend access control system;
    participate over-the-air in device user authentication upon confirmation of the unique ID, the device generating a secure key pair in response to authentication;
    exchange over-the-air a root certificate to the device in response to the device being approved for services;
    exchange over-the-air a certificate enrollment request from the device to the provisioning system; and
    exchange over-the-air a valid certificate to the device in response to a certificate authority signing the certificate request, wherein the valid certificate is installed on the device to be used in connecting the device over-the-air to the VPN.

10. The system as in claim 9, wherein the unique ID one of either a Unique Device ID (UDID) or an International Mobile Station Equipment Identity (IMEI) of the device as a handheld device; a serial number of the device as a desktop device; or a secure unique device identification (SUDI) of the device.

11. The system as in claim 9, wherein the device user authentication comprises a user name login and authenticating password.

12. The system as in claim 11, wherein the authenticating password is a one-time password (OTP).

13. The system as in claim 9, wherein the certificate authority signing the certificate request in response to a secure unique device identification (SUDI) as the unique ID comprises validating a SUDI certificate and recertifying the device with a valid certificate authority certificate.

14. A tangible, non-transitory, computer-readable media having software encoded thereon, the software when executed by a processor operable to:
    in response to a device accessing a website, establish an over-the-air connection to a services provisioning system of a virtual private network (VPN), the services provisioning system that is configured to provision both mobile and desktop devices;
    perform over-the-air device posture validation by pushing a script to the device which scans the device to obtain a unique identification (ID) of the device at the provisioning system, wherein the unique ID is confirmed by a backend access control system;
    participate over-the-air in device user authentication upon confirmation of the unique ID, the device generating a secure key pair in response to authentication;
    exchange over-the-air a root certificate to the device in response to the device being approved for services;
    exchange over-the-air a certificate enrollment request from the device to the provisioning system; and
    exchange over-the-air a valid certificate to the device in response to a certificate authority signing the certificate request, wherein the valid certificate is installed on the device to be used in connecting the device over-the-air to the VPN.

15. The tangible, non-transitory, computer-readable media as in claim 14, wherein the unique ID is one of either a Unique Device ID (UDID) or an International Mobile Station Equipment Identity (IMEI) of the device as a handheld device; a serial number of the device as a desktop device; or a secure unique device identification (SUDI) of the device.

16. The tangible, non-transitory, computer-readable media as in claim 14, wherein the device user authentication comprises a user name login and authenticating password.

17. The tangible, non-transitory, computer-readable media as in claim 16, wherein the authenticating password is a one-time password (OTP).

18. The tangible, non-transitory, computer-readable media as in claim 14, wherein the certificate authority signing the certificate request in response to a secure unique device identification (SUDI) as the unique ID comprises validating a SUDI certificate and recertifying the device with a valid certificate authority certificate.

* * * * *